United States Patent [19]

Beverett

[11] 3,715,974
[45] Feb. 13, 1973

[54] ABBREVIATED CYCLE COFFEEMAKER

[76] Inventor: James H. Beverett, 410 Nottingham Road, Montgomery, Ala. 36109

[22] Filed: June 1, 1971

[21] Appl. No.: 148,709

[52] U.S. Cl. ................................................. 99/285
[51] Int. Cl. ............................................. A47j 31/00
[58] Field of Search ........................ 99/285, 291, 293

[56] References Cited

UNITED STATES PATENTS

| | | | |
|---|---|---|---|
| 3,217,923 | 11/1965 | Price | 99/285 |
| 2,565,235 | 8/1951 | Johnson | 99/291 |
| 3,347,150 | 10/1967 | Hrabe | 99/291 |

Primary Examiner—Robert W. Jenkins

[57] ABSTRACT

A percolator type coffeemaker incorporating combined water and temperature level indicators correlated so as to provide an automatic indication of the initial water temperature required to brew a predetermined amount of coffee within a specific time. A basket insert is utilized to insure a proper and rapid flow through the ground coffee to insure a complete extraction therefrom within the abbreviated cycle achieved by utilizing specifically preheated water.

8 Claims, 8 Drawing Figures

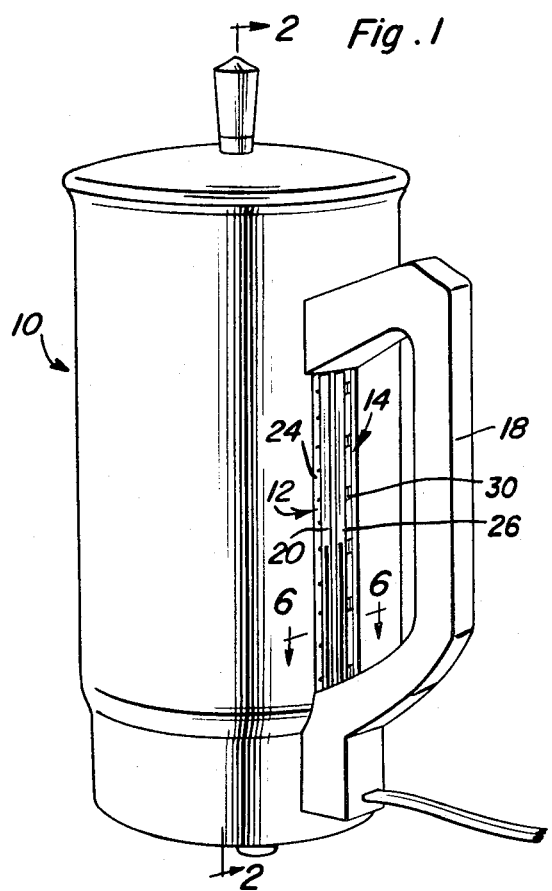
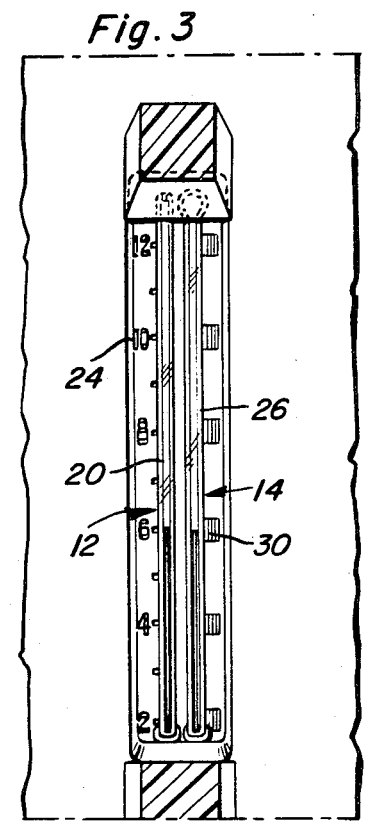
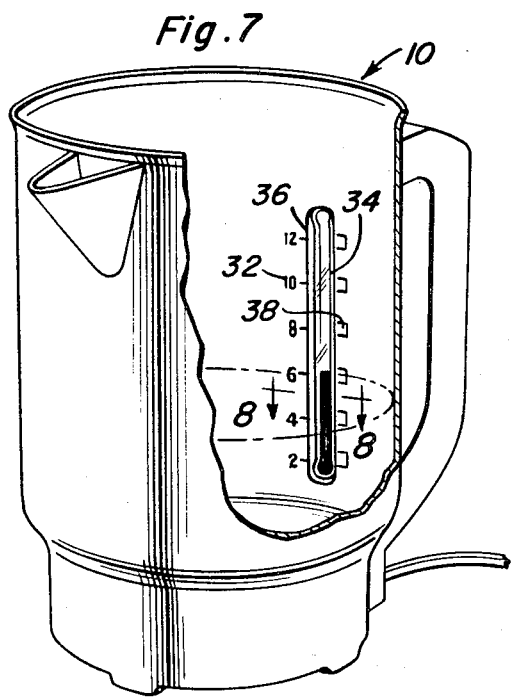
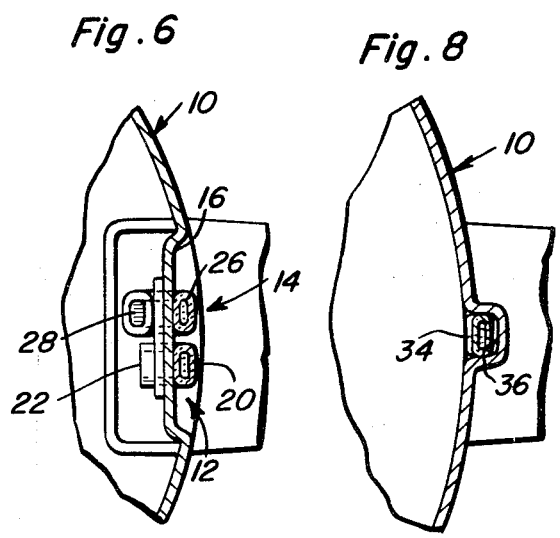
James H. Beverett
INVENTOR.

James H. Beverett
INVENTOR.

BY Clarence A. O'Brien
and Harvey B. Jacobson
Attorneys

ABBREVIATED CYCLE COFFEEMAKER

The invention herein generally relates to percolator type coffeemakers, and is more specifically concerned with improvements directing relating to shortening the brewing cycle while at the same time achieving improved flavor and aroma with no bitter extracts being present.

It has been established, primarily by coffee brewing associations and knowledgeable individuals, that the production of "good" coffee, that is coffee having the most acceptable flavor and aroma, requires the brewing of the coffee, that is the percolating water flow, occur for only a limited period of time with an extension of the brewing cycle beyond the limit resulting in an extraction of bitter acids from the ground coffee which inturn has an obvious detrimental effect on the brewed coffee. It is generally agreed that the maximum brewing time for a regular or percolator grind is 8 minutes, for a drip grind the maximum brewing time should be 6 minutes, and for a fine grind, the maximum brewing time should 4 minutes. These maximums have been found to hold true regardless of the number of cups brewed at one time. It will be noted that the finer the grind the shorter the brewing time in that complete extraction occurs much more rapidly.

The conventional home type electrically operated coffeemakers, particularly the popular 12 cup capacity percolator, have a brewing cycle of from 10 to 18 minutes when the device is filled to capacity. Those known percolators having the shorter brewing cycles incorporate extremely high wattage heating units, thus resulting in an increase in the cost of manufacture. Further, utilizing a conventional percolator, it has been found that the temperature of the water which initially reaches the coffee grains, when starting with cold water, is much too low and results in an inefficient extraction during the initial percolating stage. By the same token, the temperature of the water during the later stages, when a mixture of hot water and steam is normally generated, results in, not only an extraction of bitter acids, but also a tendency to produce a burned taste to the coffee.

The objects of the instant invention are many fold, being primarily directed to efficiently and effectively brewing coffee within the maximum times contemplated so as to achieve the most pleasing flavor and aroma utilizing simple although highly unique modifications to a conventional coffeemaker, a heating unit of lower wattage than that conventionally provided and a basket accessory which ensures a proper extraction from the coffee grains during the abbreviated brewing cycle.

Other objects of the instant invention include the provision of means so as to insure that neither underheated nor over-heated water is utilized at any point during the brewing cycle, and the utilization of components and a system which can be easily understood and followed by any homemaker.

Basically, the advantages sought by the instant invention are achieved through the utilization of a combined water level indicator and correlated temperature gauge which directly indicate the initial water temperature to be utilized to achieve brewing within the maximum brewing time for the particular amount of coffee desired. In addition, the improvements herein include an accessory cup to be utilized with the grind basket so as to insure a complete extraction of the coffee therefrom within the abbreviated cycle, particularly in those instances wherein the finer grinds are used.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 1 is a perspective view of an electric coffeemaker incorporating the features of the instant invention;

FIG. 3 is an elevational view of the exterior of the combined water level indicator and temperature gauge;

FIG. 6 is a transverse cross-sectional detail taken substantially upon a plane passing along line 6—6 in FIG. 1;

FIG. 7 is a perspective view, with portions broken away, of a coffeemaker incorporating another form of combined water level indicator and temperature gauge; and FIG. 8 is a cross-sectional detail taken substantially upon a plane passing along line 8—8 in FIG. 7.

Figure 2:
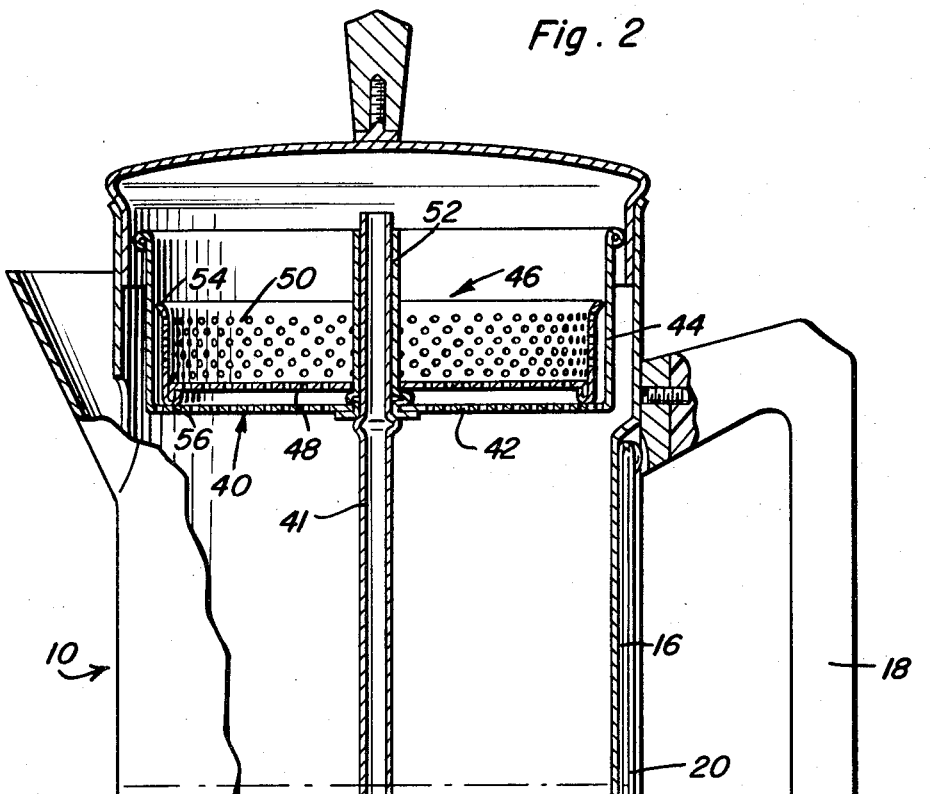
FIG. 2 is an enlarged transverse cross-sectional view taken substantially upon a plane passing along line 2—2 in FIG. 1.
Figure 4:
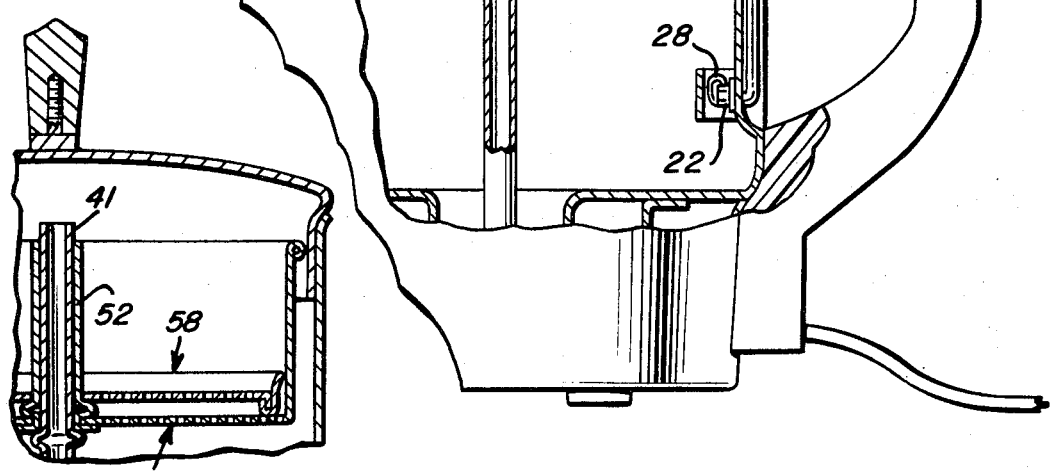
FIG. 4 is a cross-sectional detail through the upper portion of the coffeemaker illustrating a modified form of extraction aiding basket accessory.
Figure 5:
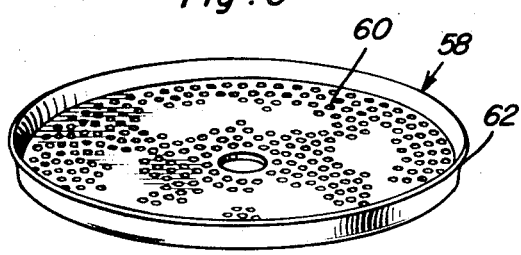
FIG. 5 is a perspective view of the modified accessory.

Referring now more specifically to the drawings, reference numeral 10 is used to generally designate a coffeemaker or percolating type coffeepot incorporating the features of the instant invention. Such features include a water level indicator 12 and a temperature gauge 14 positioned in closely spaced parallel relation to each other, preferably within a vertical depression 16 provided in the wall of the pot 10 in line with the handle 18 so as to not distract from the conventional appearance of the pot, while at the same time being readily visually accessible.

The water level indicator 12 consists of a hollow water tube 20 affixed to the exterior of the pot 10 and having the lower end thereof in direct communication with the interior of the pot as generally indicated by the reference numeral 22. In this manner, water will rise in the tube 20 to a level corresponding to the water level within the pot 10 and provide an indication of the amount of water in the pot. An appropriate series of markings 24 are provided in the pot wall immediately adjacent the tube, such markings corresponding to the number of cups which will result from a particular water level. For example, noting FIG. 3, water sufficient for 6 cups is indicated.

The temperature gauge 14 includes a thermometer tube 26 paralleling the water tube 20. This thermometer tube 26 has the lower end thereof, defining the bulb, communicated with the interior of the pot as generally indicated by reference numeral 28, thus providing for a direct sensing of the temperature of the water within the pot. Indicia 30 is also provided on the pot wall immediately adjacent and along the thermometer tube 26.

The indicia 30 indicates, in conjunction with each indicated cup level, a small range within which the initial temperature of the water should fall so as to achieve a complete brewing, without either an underbrewing or an overbrewing, of the coffee within the time contemplated to achieve the maximum in flavor and aroma. No particular numerical value need be given to the indicia 30 of the temperature gauge 14. However, it will be appreciated that such will have to be calibrated in accordance with the wattage of the pump heating unit, and the type of coffee grind to be used so as to achieve the specific brewing time contemplated to afford the optimum in good coffee. As one example, assuming a coffee pot 10 incorporating a pump heating unit of a wattage of 600 for use with a drip grind, thus, as previously indicated, requiring a maximum brewing time of 6 minutes, the temperature of the water at the initiation of the brewing should be approximately 80° F. for 4 cups, 90° F. for 6 cups, 105° F. for 8 cups, 125° F. for 10 cups, and 150° F. for 12 cups. Thus, the brewing cycle will be completed in each case in not less than 5 minutes and not more than the desired 6 minutes. The indicia 30 associated with the temperature gauge 14 will reflect these values. Incidentally, it will be appreciated that by calibrating the temperature gauge 14 whereby the level of mercury displayed thereby is, when the water is at the proper temperature, in substantial alignment with the level of the water in the water tube 20, the indicia 30 can be dispensed with. Nevertheless, the indicia 30 is in fact of value in indicating an acceptable temperature range.

FIGS. 7 and 8 illustrate a modified arrangement wherein a water level indicating scale or indicia 32 is provided along the interior of the pot 10 and adjacent a vertically elongated thermometer tube 34 positioned within an appropriate recess 36. The thermometer tube 34 has indicia 38 provided along therewith and to the opposite side from the water level indicia 32. The combination water level indicator and temperature gauge of FIG. 7 is used in the same manner as that previously described so as to enable the person making the coffee to immediately ascertain the desired water temperature and level at the beginning of the brewing cycle to achieve the results herein sought. The preheated water can, if desired, be obtained from a hot water tap or by preheating in the coffeemaker itself.

In view of the abbreviated cycle utilized to achieve the maximum in good coffee, it is necessary that there be a rapid exit of the brewed coffee through the grind containing basket 40 normally supported on the upper end of the conventionally provided central vertically elongated pumping tube 41. The basket 40 itself has a perforated bottom 42 and an imperforate annular side wall 44. This rapid exiting of the brewed coffee could be a problem wherein small diameter baskets 40 are used in conjunction with the finer grinds of coffee. Accordingly, in such situations, an accessory in the nature of a cup 46 is provided within the basket 40. The cup 46 has a perforated bottom 48 and a perforated annular wall 50 which is orientated in inwardly spaced relation to the basket wall 44. The bottom 48 of the cup 46 includes a central aperture therethrough enabling a seating of the cup over the central pumping tube 42 as well as the cylindrical stem 52 of the basket 40. Further, the upper edge of the cup wall 50 is outwardly flared, as at 54, to maintain a space between the cup wall 50 and the basket wall 44 for the free flow of the coffee from the cup 46. In addition, the lower edge of the cup wall 50, in conjunction with the outer periphery of the cup bottom 48, provides a depending peripheral support flange 56 which spaces the cup bottom 48 above the basket bottom 42. The coffee grind is placed within the cup 46, the bottom and side holes of which are larger than the holes in the bottom of the coffee basket. In this manner, there is insured a more rapid exit of the brewed coffee from the cup 46 and from therethrough the smaller holes in the bottom 42 of the coffee basket 40, and insures that no undesirable basket overflow occurs.

In those situations wherein a medium grind is used in conjunction with a relatively small diameter coffee basket, the accessory plate 58 can be substituted for the cup 46. This plate includes an elevated perforated bottom 60 and only a peripheral lip 62, rather than an upwardly projecting side wall as with the cup 46. The holes in the bottom 60 of the plate are larger than the holes in the bottom of the associated basket 40, and the grind carrying plate 58 cooperates with the basket 40 in insuring a rapid exiting of the brewed coffee therethrough so as to enhance the feasibility of the abbreviated cycle system.

In those instances wherein course grinds are utilized, such also normally entails the use of relatively large diameter baskets as well as a relatively longer brewing time. Accordingly, there is less of a requirement for a rapid exiting of the brewed coffee. In view of this, and inasmuch as the large diameter baskets provide a greater area for an exiting of the brewed coffee, no accessories in the nature of the cup 46 or plate 58 are required.

From the foregoing, it will be appreciated that a unique coffee brewing system has been defined. The system herein results in a considerable shortening of the normal brewing cycle time and at the same time results in a better tasting coffee and a simple, practical and novel manner of providing these desirable objects. Furthermore, the instant invention provides for a brewing of the coffee within the time period deemed most effective to achieve a maximum in flavor and aroma while maintaining a temperature which avoids the normally experienced temperature excesses including an initial stage wherein the water is too cool to perform a proper brew extraction and a final stage wherein the water and steam vapor results in a "burned" taste. Provision is also made for insuring a rapid exiting of the brewed coffee from the basket, particularly in those cases wherein the shorter cycles are involved and the finer grinds are being used.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. An abbreviated cycle coffeemaker comprising a coffee pot including a peripheral wall defining an interior brewing chamber, a water level indicator provided vertically along said wall, and a temperature gauge paralleling said water level indicator immediately adjacent thereto wherein said temperature gauge is calibrated to indicate a predetermined starting water temperature at an approximate height corresponding to the level of water indicated on the water level indicator which will result in a completed brewing cycle within a predetermined time.

2. The coffeemaker of claim 1 wherein said temperature gauge is calculated to indicate a starting water temperature for any water level by a mercury height which corresponds to the water level height as indicated at any point along the water level indicator.

3. The coffeemaker of claim 2 wherein said water level indicator comprises an elongated water tube mounted on the exterior of said wall and communicated, at the lower end thereof, with the interior of said coffee pot, said temperature gauge comprising an elongated thermometer tube having a bulb on the lower end thereof positioned in heat receiving communication with the interior of the coffee pot.

4. The coffeemaker of claim 2 wherein said water level indicator comprises a series of vertical indicia provided on the wall within the interior of the coffee pot, said temperature gauge comprising an elongated thermometer tube mounted on the wall within the coffee pot in parallel relation to and immediately adjacent said markings.

5. The coffeemaker of claim 2 including a coffee grind receiving basket positioned within the upper portion of the interior of said coffee pot, and a grind supporting accessory mounted within said basket and maintained in spaced relation to both the bottom of the basket and the sides thereof, said accessory and said basket including brew passing apertures, the accessory apertures being larger than the basket apertures.

6. The coffeemaker of claim 5 wherein said accessory in the nature of a cup including a flat perforated bottom and an annular upstanding perforated side wall.

7. The coffeemaker of claim 5 wherein said accessory is in the nature of a flat perforated plate supported in spaced relation above the bottom of the basket by a peripheral flange.

8. An abbreviated cycle coffeemaker comprising a coffee pot, means mounted on said pot for providing an indication of the level of the water in said pot, and second means mounted on said pot and providing an automatic indication of the temperature at which the water should be upon the initiation of a brewing cycle in order to achieve a proper brewing of the coffee grains for a cycle of predetermined length, the length of the cycle being equal for all levels of water with the temperature of the water at the initiation of the cycle varying in accordance with the level of the water and being directly indicated by said second means.

* * * * *